United States Patent

Ribarich et al.

(10) Patent No.: US 7,521,874 B2
(45) Date of Patent: Apr. 21, 2009

(54) DIMMABLE BALLAST CONTROL INTEGRATED CIRCUIT

(75) Inventors: Thomas Ribarich, Laguna Beach, CA (US); Peter Green, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/546,824

(22) Filed: Oct. 12, 2006

(65) Prior Publication Data

US 2007/0085488 A1    Apr. 19, 2007

Related U.S. Application Data

(60) Provisional application No. 60/725,707, filed on Oct. 12, 2005.

(51) Int. Cl.
    H05B 37/02    (2006.01)
(52) U.S. Cl. .................. 315/224; 315/247; 315/307
(58) Field of Classification Search .................. 315/194, 315/209 R, 224–225, 244, 291, 307–308, 315/DIG. 4, DIG. 7, 246–247
    See application file for complete search history.

(56) References Cited

U.S. PATENT DOCUMENTS

| | | | | |
|---|---|---|---|---|
| 5,604,411 | A * | 2/1997 | Venkitasubrahmanian et al. | 315/307 |
| 6,002,213 | A * | 12/1999 | Wood | 315/307 |
| 6,008,593 | A * | 12/1999 | Ribarich | 315/307 |
| 6,218,788 | B1 * | 4/2001 | Chen et al. | 315/225 |
| 6,603,274 | B2 * | 8/2003 | Ribarich et al. | 315/291 |
| 6,617,805 | B2 * | 9/2003 | Ribarich et al. | 315/247 |
| 6,949,888 | B2 * | 9/2005 | Ribarich | 315/291 |
| 7,064,497 | B1 * | 6/2006 | Hsieh | 315/246 |
| 7,091,671 | B2 * | 8/2006 | Deurloo et al. | 315/247 |
| 2002/0033678 | A1 * | 3/2002 | Gyoten et al. | 315/219 |
| 2004/0263093 | A1 * | 12/2004 | Matsubayashi et al. | 315/248 |
| 2005/0200314 | A1 * | 9/2005 | Vakil et al. | 315/307 |
| 2006/0082325 | A1 * | 4/2006 | Vakil et al. | 315/224 |
| 2006/0175983 | A1 * | 8/2006 | Crouse et al. | 315/291 |

* cited by examiner

*Primary Examiner*—David Hung Vu
*Assistant Examiner*—Tung X Le
(74) *Attorney, Agent, or Firm*—Ostrolenk, Faber, Gerb & Soffen, LLP (57) ABSTRACT

An IC for controlling a power supply circuit for delivering power to a fluorescent lamp in accordance with an embodiment of the present invention includes a ballast control section operable to provide drive signals to the power supply circuit and an amplifier section integrated into the IC and operable to provide a dimming signal to the ballast control section. The ballast control section drives the power supply circuit to provide for dimming of the lamp based on the dimming signal. An IC for controlling a power supply circuit for delivering power to a fluorescent lamp in accordance with another embodiment of the present application includes a ballast control section operable to provide drive signals to the power supply circuit; and an amplifier section integrated into the IC. The ballast control section provides the drive signals to the power supply circuit, receives current sense signals indicative of current in said lamp, and responds to the current sense signals by modifying the drive signals.

13 Claims, 11 Drawing Sheets

LEAD ASSIGNMENTS & DEFINITIONS

| PIN # | SYMBOL | DESCRIPTION |
|---|---|---|
| 1 | CPH | PREHEAT TIMING INPUT |
| 2 | FMIN | OSCILLATOR MINIMUM FREQUENCY SETTING |
| 3 | VCO | VOLTAGE CONTROLLED OSCILLATOR/IGNITION RAMP INPUT |
| 4 | OUT | DIMMING OpAmp OUTPUT |
| 5 | NINV | NONINVERTING PIN OF DIMMING OpAmp |
| 6 | INV | INVERTING PIN OF DIMMING OpAmp |
| 7 | SD/EOL | SHUT-DOWN/END OF LIFE SENSING INPUT |
| 8 | CS | HALF-BRIDGE CURRENT SENSING INPUT |
| 9 | LO | LOW-SIDE GATE DRIVER OUTPUT |
| 10 | COM | IC POWER & SIGNAL GROUND |
| 11 | VCC | LOGIC & LOW-SIDE GATE DRIVER SUPPLY |
| 12 | VB | HIGH-SIDE GATE DRIVER FLOATING SUPPLY |
| 13 | VS | HIGH VOLTAGE FLOATING RETURN |
| 14 | HO | HIGH-SIDE GATE DRIVER OUTPUT |

IRS2158D

FIG.4

TIMING DIAGRAMS BALLAST SECTION

EQUIVALENT RFMIN RESISTOR vs. OUTPUT FREQUENCY

DIMMABLE BALLAST CONTROL INTEGRATED CIRCUIT

RELATED APPLICATIONS

This application claims the benefit of and priority to U.S. Provisional Application No. 60/725,707 entitled DIMMABLE BALLAST CONTROL IC filed Oct. 12, 2005, the entire contents of which are hereby incorporated by reference herein.

BACKGROUND

1. Field of the Invention

The present invention relates to a ballast control IC, particularly for driving fluorescent lamps, and more particularly to a ballast control IC with an operational amplifier incorporated into the ballast control IC.

2. Related Art

Electronic ballasts for gas discharge circuits have come into widespread use, at least in part to the availability of power MOSFET switching devices and insulated gate bipolar transistors (IGBTs) that can replace previously used power bipolar switching devices. A number of integrated circuits have been devised for driving the gates of power MOSFETs or IGBTs in electronic ballasts. Some examples include the IR2155, IR2157, IR21571 and IR2167 products which are sold by International Rectifier Corporation, the assignee of the present application. These products are further described in U.S. Pat. Nos. 5,545,955 and 6,211,623 the disclosures of which are hereby incorporated by reference herein.

One of the features that is useful in electronic ballasts is the ability to dim the fluorescent lamp. While IC control circuits have been introduced that include this feature, such circuits provide only a very specific manner of achieving ballast control. That is, these conventional control IC's lack flexibility. For example, the IR21592, another product of the assignee, International Rectifier Corporation, provides for dimming of a fluorescent lamp, however, dimming is accomplished by means of phase control regulation. While this solution provides adequate dimming, the function of the IC remains limited.

Thus, it would be desirable to provide a control IC for a ballast with increased flexibility that allows for increased functionality such as by including an operational amplifier that is integrated directly into the IC to provide for dimming or other functionality.

SUMMARY OF THE INVENTION

It is an object of the present invention to provide an electronic ballast with increased functionality.

An IC for controlling a power supply circuit for delivering power to a fluorescent lamp in accordance with an embodiment of the present invention includes a ballast control section operable to provide drive signals to the power supply circuit and an amplifier section integrated into the IC and operable to provide a dimming signal to the ballast control section. The ballast control section drives the power supply circuit to provide for dimming of the lamp based on the dimming signal.

An IC for controlling a power supply circuit for delivering power to a fluorescent lamp in accordance with another embodiment of the present application includes a ballast control section operable to provide drive signals to the power supply circuit; and an amplifier section integrated into the IC. The ballast control section provides the drive signals to the power supply circuit, receives current sense signals indicative of current in said lamp, and responds to the current sense signals by modifying the drive signals.

Other features and advantages of the present invention will become apparent from the following description of the invention which refers to the accompanying drawings.

DETAILED DESCRIPTION OF PREFERRED EMBODIMENTS OF THE INVENTION

Figure 1:
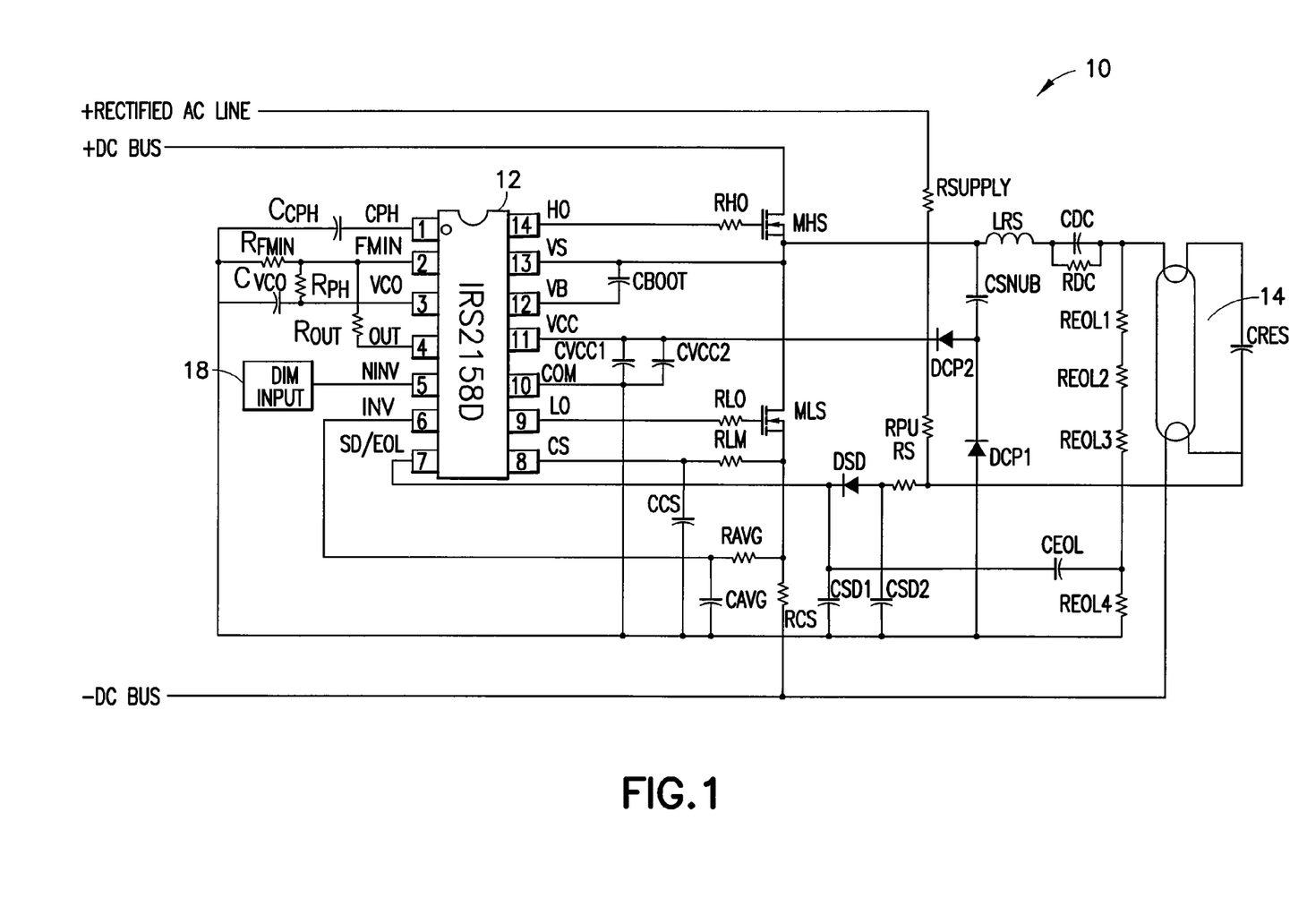
FIG. 1 is a schematic diagram showing a typical application of the ballast control IC of the present invention.

FIG. 1 illustrates a typical application for a ballast control IC in accordance with an embodiment of the present invention.

The circuit 10 in FIG. 1 illustrates pin and external connections for the ballast control IC 12 in which the circuitry of the present invention may be implemented. As illustrated, the ballast control circuit 12 is represented as a product of the assignee of the present application, International Rectifier Corporation, and is designated the IRS2158D IC. As illustrated, the IRS2158D is preferably used to drive the half bridge formed by the power MOSFETs MHS and MLS which provide power for the lamp 14. Generally, the ballast control IC 12 of the present invention has two parts. The first part is a ballast control section 12a which provides all the necessary functionality to drive the half bridge. See FIG. 2. The ballast control IC 12 further includes an amplifier section 12b which provides an independent operation amplifier that is directly embedded into the die of the ballast control IC 12. As illustrated, the pins INV, NINV and OUT of the IC 12 are connected to the inverting input, noninverting input and output, respectively, of the operational amplifier 22 such that the inputs and output of the operational amplifier are easily accessible.

The ballast control section 12a of the ballast control IC 12 operates in substantially the same manner as the ballast control section of assignee's IR S2168D ballast control IC, which is described in detail in co-pending U.S. patent application Ser. No. 11/102,603 entitled PFC AND BALLAST CONTROL IC filed Apr. 8, 2005, the entire contents of which are hereby incorporated by reference herein. While the ballast control IC 12 illustrated in FIG. 1 of the present application does not include integrated power factor correction (PFC) like the IRS2168D, such power factor correction circuitry can be easily added externally, if desired.

The amplifier section 12b of the ballast control IC 12 is integrated directly into the die of the ballast control IC 12 such that the pins INV, NINV and OUT (pin nos. 4,5 and 6) of the ballast control IC correspond to the inverting input, non-inverting input and output, respectively, of the independent operational amplifier 22. See FIG. 2.

Figure 3:
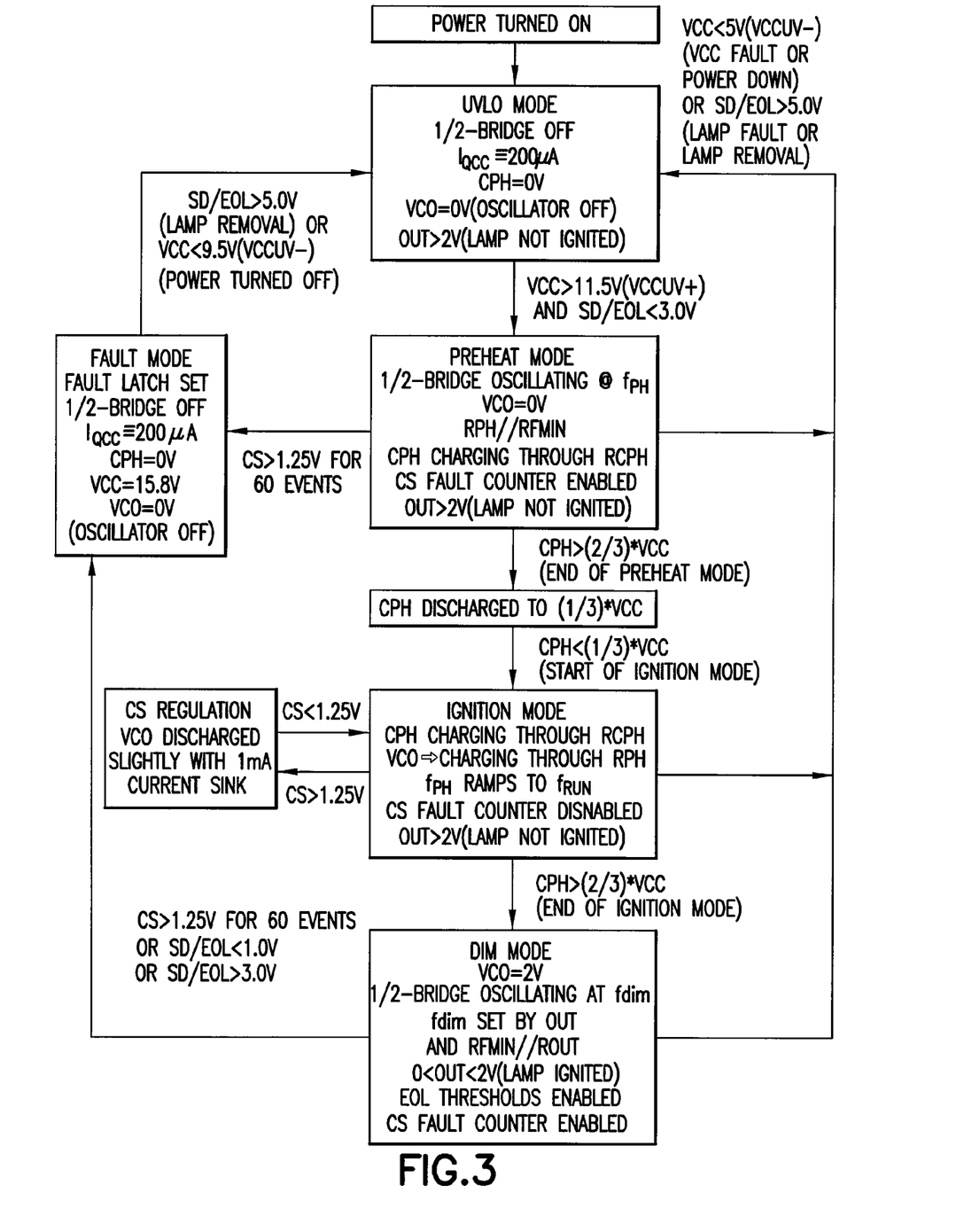
FIG. 3 is a state diagram showing the operating modes of the ballast control IC of FIG. 1.
Figure 4:
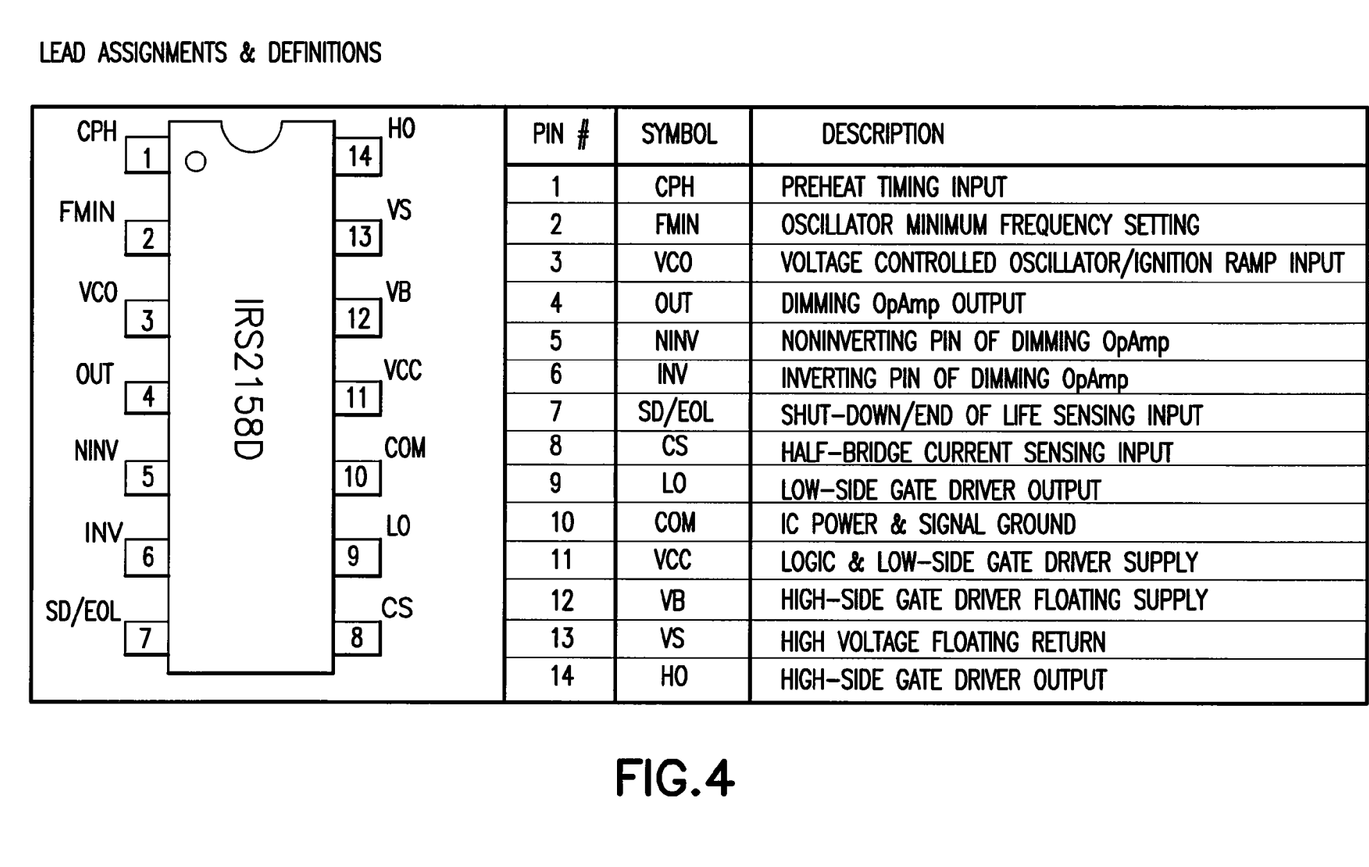
FIG. 4 shows the lead assignments and definitions of the ballast control IC of FIG. 1.

The ballast control IC 12 operates in five modes. These modes are described in further detail with reference to FIG. 3 of the present application.

Under-Voltage Lock-Out Mode (UVLO)

Figure 6:
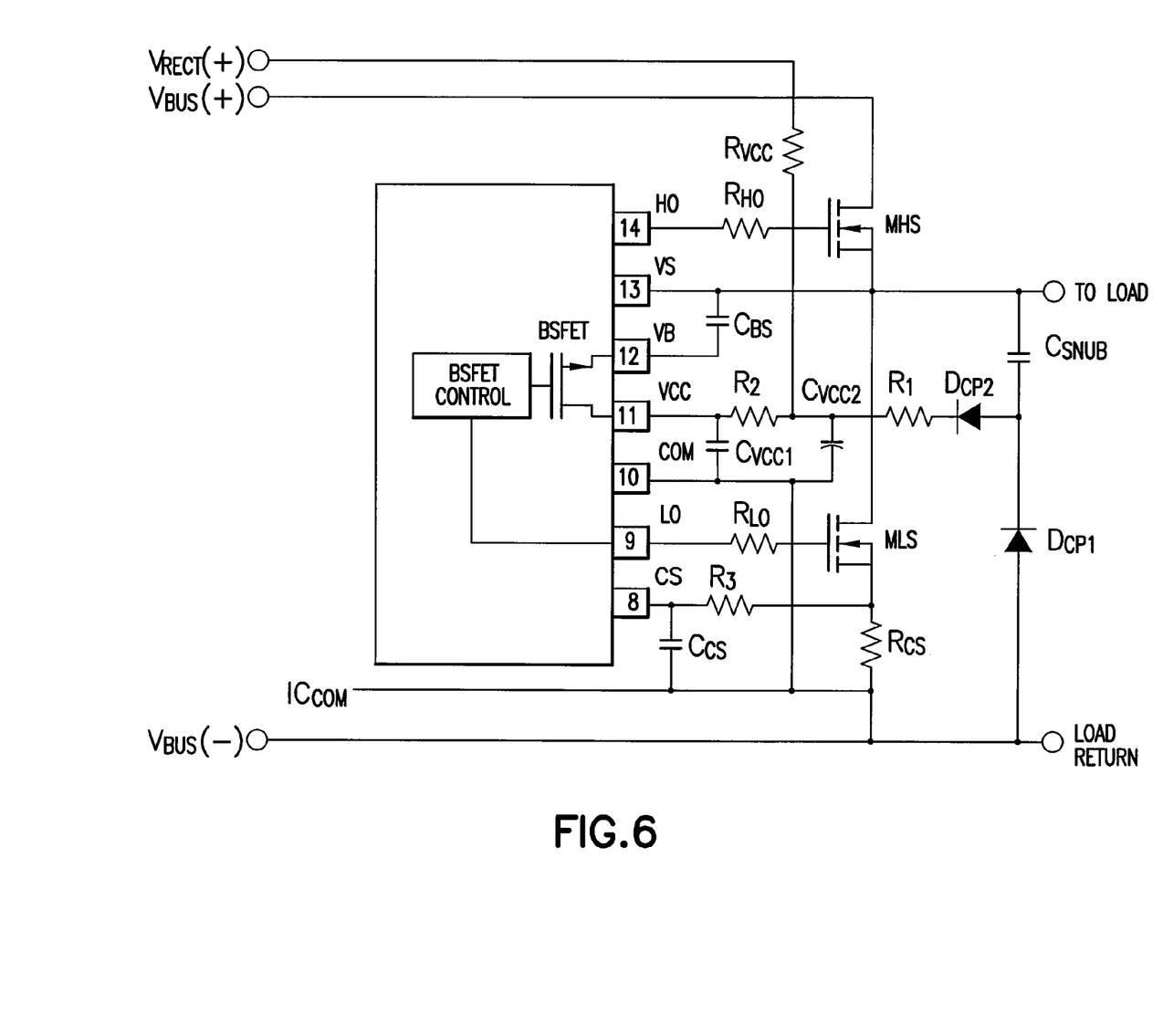
FIG. 6 shows start-up and supply circuitry.

The under-voltage lock-out mode (UVLO) is defined as the state the ballast control IC 12 is in when the logic supply voltage VCC is below the turn-on threshold of the IC. To identify the different modes of the IC, refer to the State Diagram shown in FIG. 3. The ballast control IC 12 under-voltage lock-out is designed to maintain an ultra low supply current of less than 500 µA, and to guarantee that the IC is fully functional before the high- and low-side output drivers (see FIG. 2) are activated. FIG. 6 shows an efficient voltage supply using the micro-power start-up current of the control IC 12 together with a snubber charge pump from the half-bridge output ($R_{VCC}1$, $C_{VCC1}$, $C_{VCC2}$, $C_{SNUB}$, $D_{CP1}$ and $D_{CP2}$).

Figure 7:
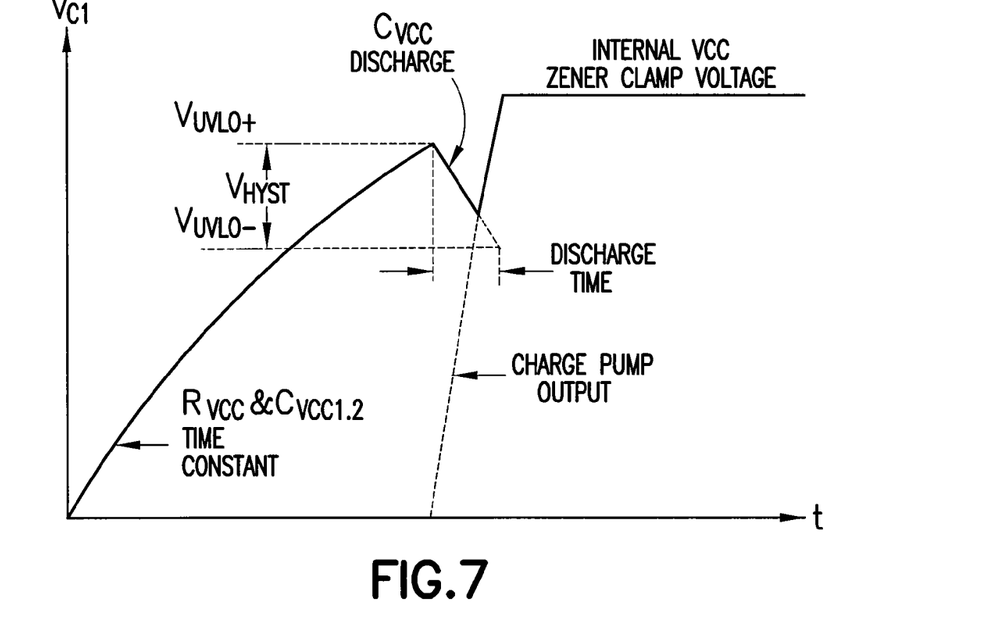
FIG. 7 is a graph showing Vcc supply voltage versus time during start-up.

The VCC capacitors ($C_{VCC1}$, and $C_{VCC2}$) are charged by the current through supply resistor ($R_{VCC}$) minus the start-up current drawn by the ballast control IC 12. This resistor is chosen to set the desired AC line input voltage turn-on threshold for the ballast. When the voltage at VCC exceeds the IC start-up threshold (UVLO+ or VCCUV+) and the SD pin is below 4.5 volts, the IC turns on and LO begins to oscillate. The capacitors at VCC begin to discharge due to the increase in IC operating current (see FIG. 7). The high-side supply voltage, VB-VS, begins to increase as capacitor $C_{BS}$ is charged through the internal bootstrap MOSFET 24 (see FIG. 2) during the LO on-time of each LO switching cycle. When the VB-VS voltage exceeds the high-side start-up threshold (UVBS+ or VBSUV+), HO then begins to oscillate. This may take several cycles of LO to charge VB-VS above VBSUV+ due to RDS on of the internal bootstrap MOSFET 24.

Figure 2:
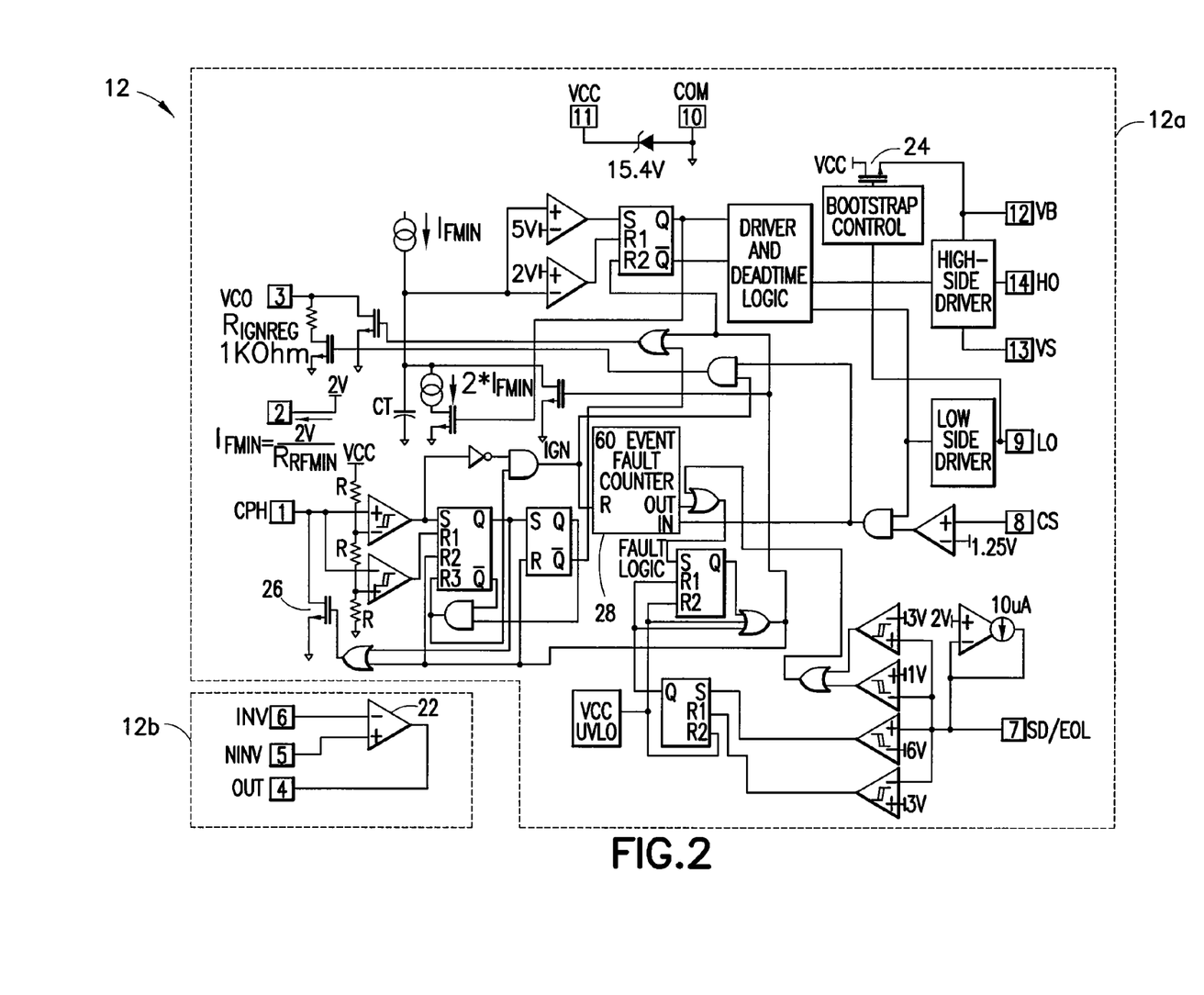
FIG. 2 is a schematic block diagram of the ballast control IC of FIG. 1.

When LO and HO are both oscillating, the external MOSFETs (MHS and MLS) of the half bridge are turned on and off with a 50% duty cycle and a non-overlapping deadtime of 1.6 µs. The half-bridge output (pin VS) begins to switch between the DC bus voltage and COM. During the deadtime between the turn-off of LO and the turn-on of HO, the half-bridge output voltage transitions from COM to the DC bus voltage at a dv/dt rate determined by the snubber capacitor ($C_{SNUB}$). As the snubber capacitor charges, current will flow through the charge pump diode ($D_{CP2}$) to VCC. After several switching cycles of the half-bridge output, the charge pump and the internal 15.4V zener clamp of the IC take over as the supply voltage. Capacitor $C_{VCC2}$ supplies the IC current during the VCC discharge time and should be large enough such that VCC does not decrease below UVLO− (VCCUV−) before the charge pump takes over. Capacitor $C_{VCC1}$ is provided for noise filtering and is placed as close as possible and directly between VCC and COM, and should not be lower than 0.1 µF. Resistors $R_1$ and $R_2$ are recommended for limiting high currents that can flow to VCC from the charge pump during hard-switching of the half-bridge or during lamp ignition. The internal bootstrap MOSFET 24 and supply capacitor ($C_{BS}$) comprise the supply voltage for the high side driver circuitry. During UVLO mode, the high- and low-side driver outputs HO and LO are both low, the internal oscillator is disabled, and pin CPH is connected internally to COM for resetting the preheat time.

Preheat Mode (PH)

Figure 8:
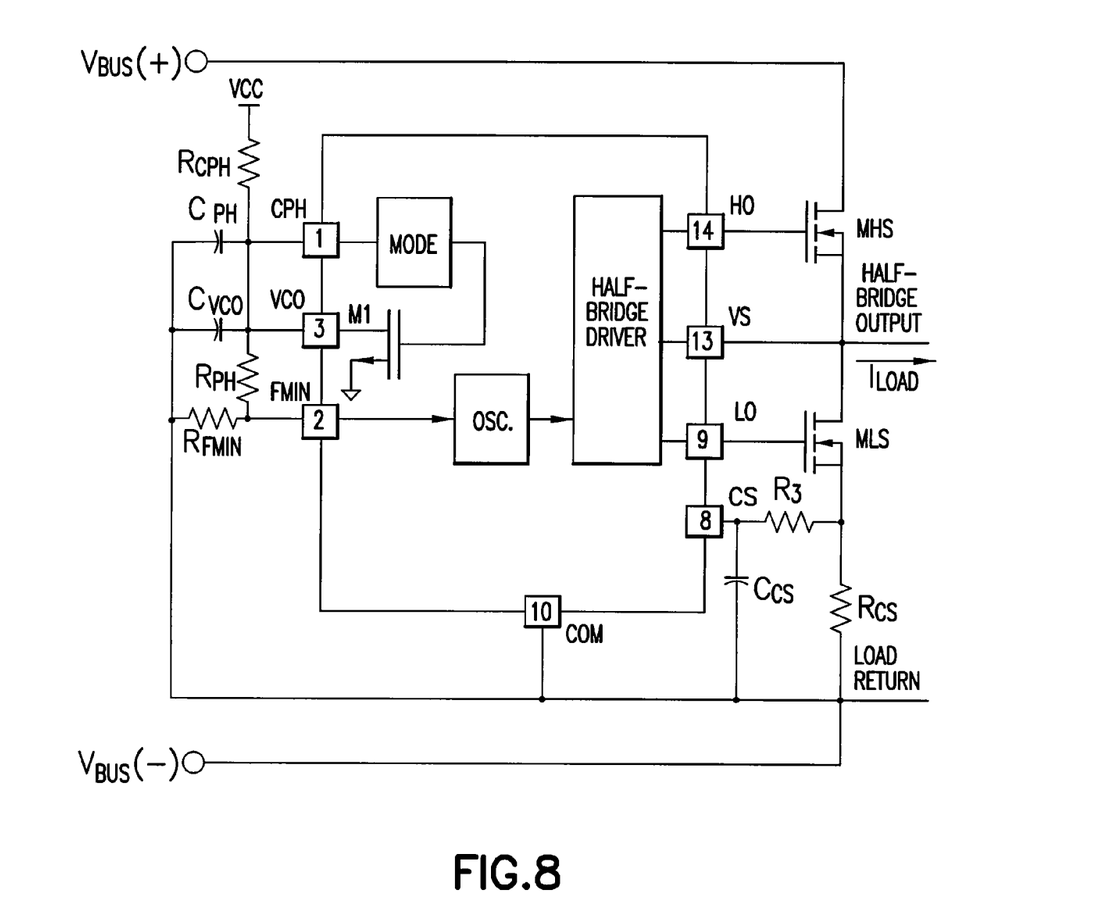
FIG. 8 is a schematic block diagram showing preheat circuitry.

The control IC 12 enters preheat mode when VCC exceeds the UVLO positive-going threshold (UVLO+/VCCUV+). The internal MOSFET 26 that connects pin CPH to COM (see FIG. 2) is turned off and an external resistor $R_{CPH}$ (FIG. 8) begins to charge the external preheat timing capacitor ($C_{PH}$). LO and HO begin to oscillate at a higher soft-start frequency and ramp down quickly to the preheat frequency. The VCO pin is connected to COM through an internal MOSFET M1 (see FIG. 8) so the preheat frequency is determined by the equivalent resistance at the FMIN pin formed by the parallel combination of resistors $R_{FMIN}$ and $R_{PH}$. The frequency remains at the preheat frequency until the voltage on pin CPH exceeds ⅔*VCC and the IC enters Ignition Mode. During preheat mode, the over-current protection on pin CS and the 60-cycle consecutive over-current fault counter are both enabled.

Ignition Mode (IGN)

Figure 9:
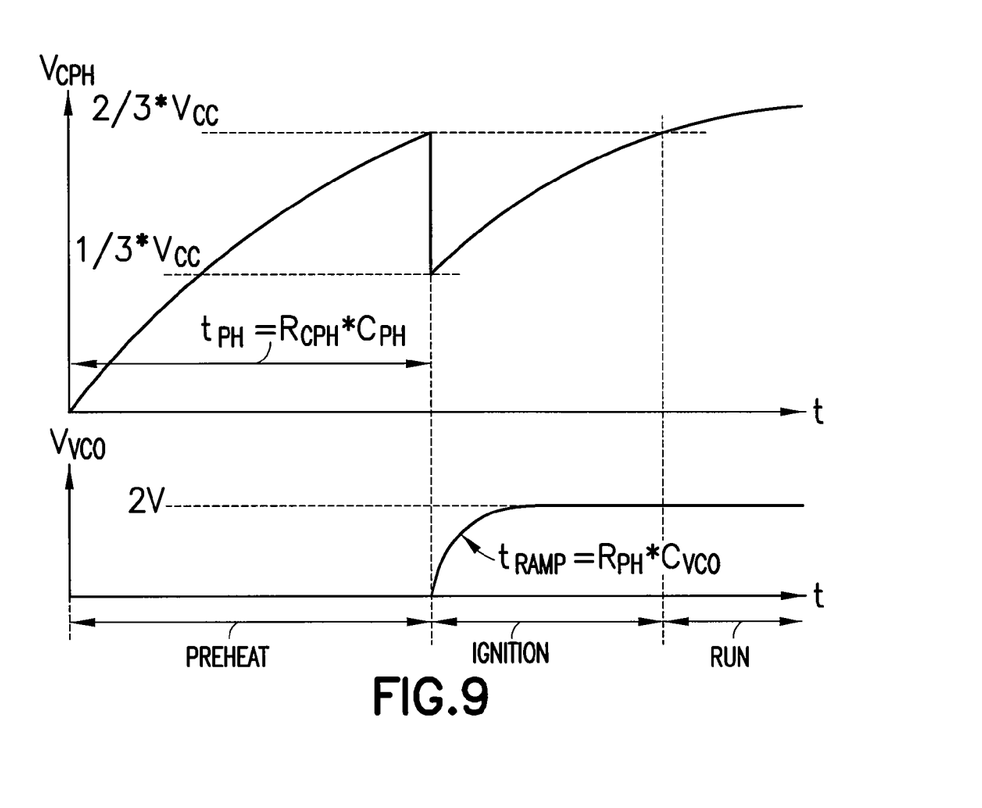
FIG. 9 is a timing diagram relative to the preheat and oscillator functions.
Figure 10:
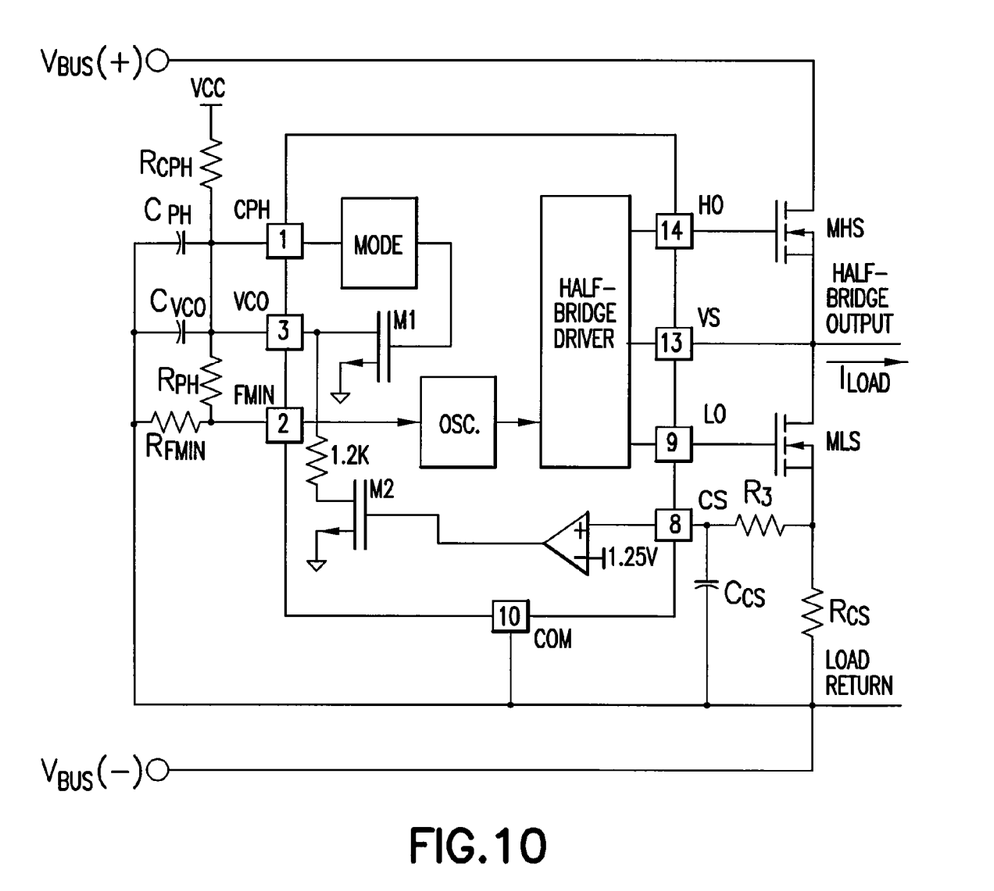
FIG. 10 shows ignition circuitry.

The ballast control IC 12 ignition mode is defined by the second time CPH charges from ⅓*VCC to ⅔*VCC. When the voltage on pin CPH exceeds ⅔*VCC for the first time, pin CPH is discharged quickly through an internal MOSFET down to ⅓*VCC (see FIGS. 9 and 10). The internal MOSFET turns off and the voltage on pin CPH begins to increase again. The internal MOSFET M1 at pin VCO turns off and resistor $R_{PH}$ is disconnected from COM. The equivalent resistance at the FMIN pin increases from the parallel combination ($R_{PH}$// $R_{FMIN}$) to $R_{FMIN}$ at a rate programmed by the external capacitor at pin VCO ($C_{VCO}$) and resistor $R_{PH}$. This causes the operating frequency to ramp down smoothly from the preheat frequency through the ignition frequency and eventually to the dim frequency discussed below. During this ignition ramp, the frequency sweeps through the resonance frequency of a lamp output stage to ignite the lamp 14.

Figure 11:
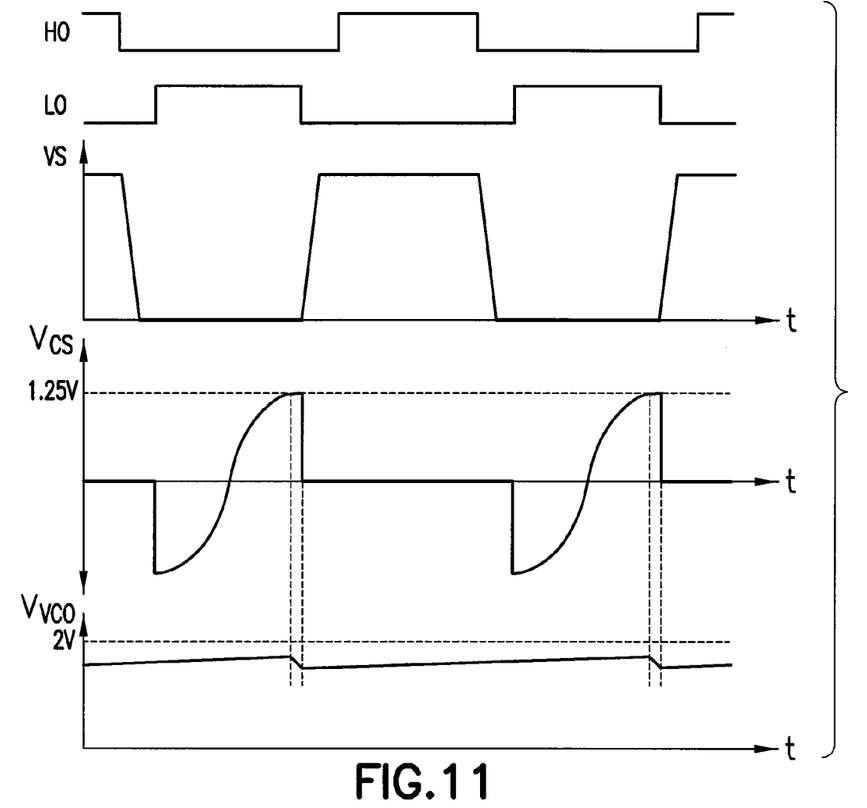
FIG. 11 shows a timing diagram relative to ignition regulation.

The over-current threshold on pin CS will protect the ballast against a non-strike or open-filament lamp fault condition. The voltage on pin CS is defined by the lower half-bridge MOSFET current flowing through the external current sensing resistor RCS. This resistor programs the maximum peak ignition current (and therefore peak ignition voltage) of the ballast output stage. Should this voltage exceed the internal threshold of 1.25V, the ignition regulation circuit discharges the VCO voltage slightly to increase the frequency slightly (see FIG. 11). This cycle-by-cycle feedback from the CS pin to the VCO pin will adjust the frequency each cycle to limit the amplitude of the current for the entire duration of ignition mode. When CPH exceeds ⅔*VCC for the second time, the IC 12 enters dim mode and the fault counter becomes enabled. The ignition regulation remains active in dim mode but the IC will enter fault mode after 60 consecutive over-current faults and gate driver outputs HO, LO will be latched low as is discussed below.

Dim Mode (DIM)

Once VCC has exceeded ⅔*VCC for the second time, the IC enters dim mode. CPH continues to charge up to VCC. The operating frequency is at the minimum frequency (after the ignition ramp) and is programmed by the external resistor ($R_{FMIN}$) at the FMIN pin and the external capacitor $C_{VCO}$ at the VCO pin. The frequency is minimum and the lamp current is maximum when the value at pin VCO is 2 volts.

In order to dim the lamp 14, the amplifier section 12b of the ballast control IC 12 may be used. A dimming input is provided by a dim device 18 (see FIG. 1) and is received at the noninverting input of the operational amplifier 22 (see FIG. 2) via the pin NINV of IC 12. A signal indicative of the lamp current is provided from the current sensing resistor RCS to the inverting input of the operational amplifier 22 via pin INV. When the lamp current signal is lower than the dimming input, the output of the operational amplifier 22, which is provided at pin OUT, increases. The equivalent parallel resistance provided by $R_{FMIN}$ and $R_{OUT}$ also increase, which causes the frequency to decrease and the lamp current to increase. Conversely, when the lamp current signal is greater than the dimming input, the output of the operation amplifier 22 at the pin OUT decreases. The equivalent parallel resistance provided by $R_{FMIN}$ and $R_{OUT}$ also decreases, which causes the frequency to increase and the lamp current to decrease. The minimum dim frequency is set by the value of the resistor $R_{FMIN}$. The maximum dim frequency is determined by the value of $R_{FMIN}//R_{OUT}$. This minimum and maximum should be set with a wide enough margin so that the control loop including the operational amplifier 22 can regulate the lamp current to the desired minimum and maximum levels.

Figure 12:
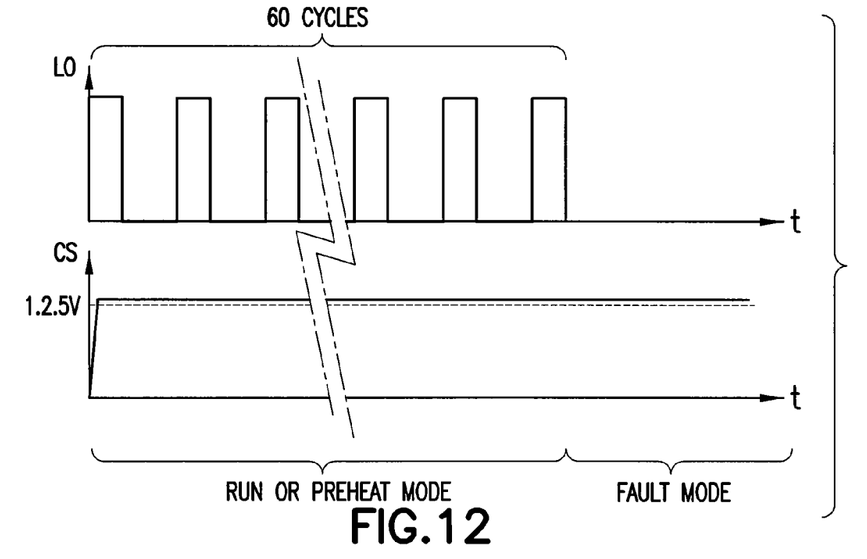
FIG. 12 shows a timing diagram for the fault counter.

Should hard-switching occur at the half-bridge at any time (open-filament, lamp removal, etc.), the voltage across the current sensing resistor (RCS) will exceed the internal threshold of 1.25 volts and the fault counter will begin counting (see FIG. 12). Should the number of consecutive over-current faults exceed 60, the IC 12 will enter fault mode and the HO and LO outputs will be latched low. During dim mode, the end-of-life (EOL) window comparator and the DC bus undervoltage reset are both enabled.

SD/EOL and CS Fault Mode (FAULT)

Figure 5:
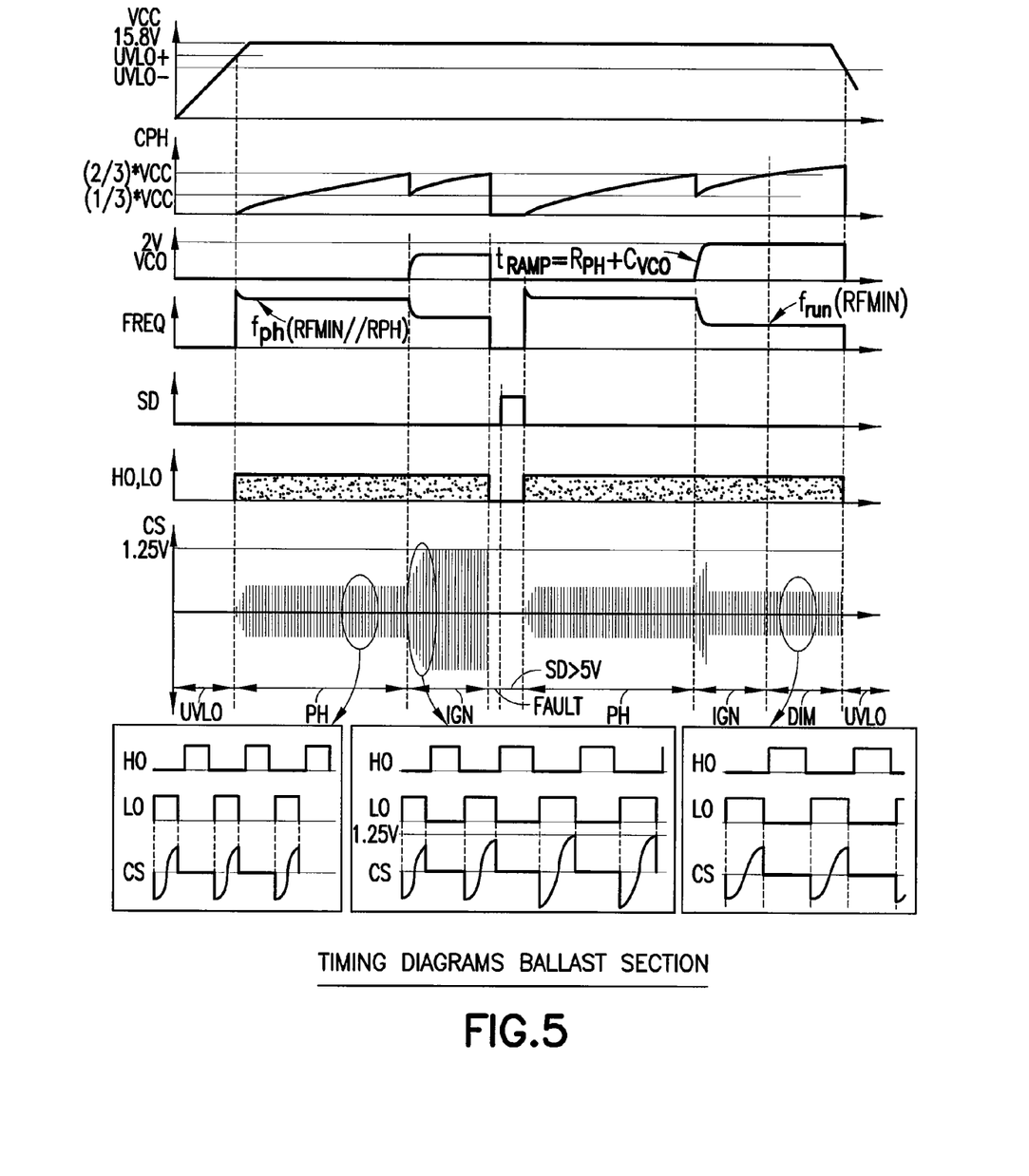
FIG. 5 shows timing diagrams for the ballast section of the ballast control IC of FIG. 1.

Should the voltage at the SD/EOL pin exceed 3V or decrease below 1V during dim mode, an end-of-life (EOL) fault condition has occurred and the ballast control IC 12 enters fault mode. End of life circuitry and processing within a ballast control IC are discussed in detail in assignee International Rectifier Corporation's co-pending U.S. patent application Ser. No. 10/875,474 entitled BALLAST CONTROL IC WITH MULTI-FUNCTION FEEDBACK SENSE filed Jun. 23, 2004, the entire contents of which are hereby incorporated by reference herein. In fault mode, the LO and HO driver outputs are latched off in the 'low' state. CPH is discharged to COM to allow for resetting the preheat time and VCO is discharged to COM for resetting the frequency. To exit fault mode, VCC can be decreased below UVLO− (VCCUV−, ballast power off) or the SD pin can be increased above 5V (lamp removal). Either of these will force the IC to enter UVLO mode (see State Diagram, FIG. 5). Once VCC is above UVLO+ (VCCUV+, ballast power on) and SD is pulled above 5V and back below 3V (lamp re-insertion), the IC 12 will enter preheat mode and begin oscillating again.

The current sense function will force the IC to enter fault mode only after the voltage at the CS pin has been greater than 1.25V for 60 consecutive cycles of LO as determined by the fault event counter 28. See FIG. 2. The voltage at the CS pin is AND-ed with LO (see FIG. 12) so it will work with pulses that occur during the LO on-time or DC. If the over-current faults are not consecutive, then the internal fault counter will count down each cycle when there is no fault. Should an over-current fault occur only for a few cycles and then not occur again, the counter will eventually reset to zero. The over-current fault counter is enabled during preheat and run modes and disabled during ignition mode.

Ballast Design Equations

Note: The results from the following design equations can differ slightly from actual measurements due to IC tolerances, component tolerances, and oscillator over- and under-shoot due to internal comparator response time.

Step 1: Program Minimum Frequency

The minimum frequency is programmed with the timing resistor $R_{FMIN}$ at the FMIN pin as noted above. The minimum frequency is given as:

$$f_{MIN} = \frac{1}{(4.8e-10) \cdot R_{FMIN}} \quad [Hertz] \qquad (1)$$

or $$R_{FMIN} = \frac{1}{(4.8e-10) \cdot f_{MIN}} \quad [Ohms] \qquad (2)$$

or

Figure 13:
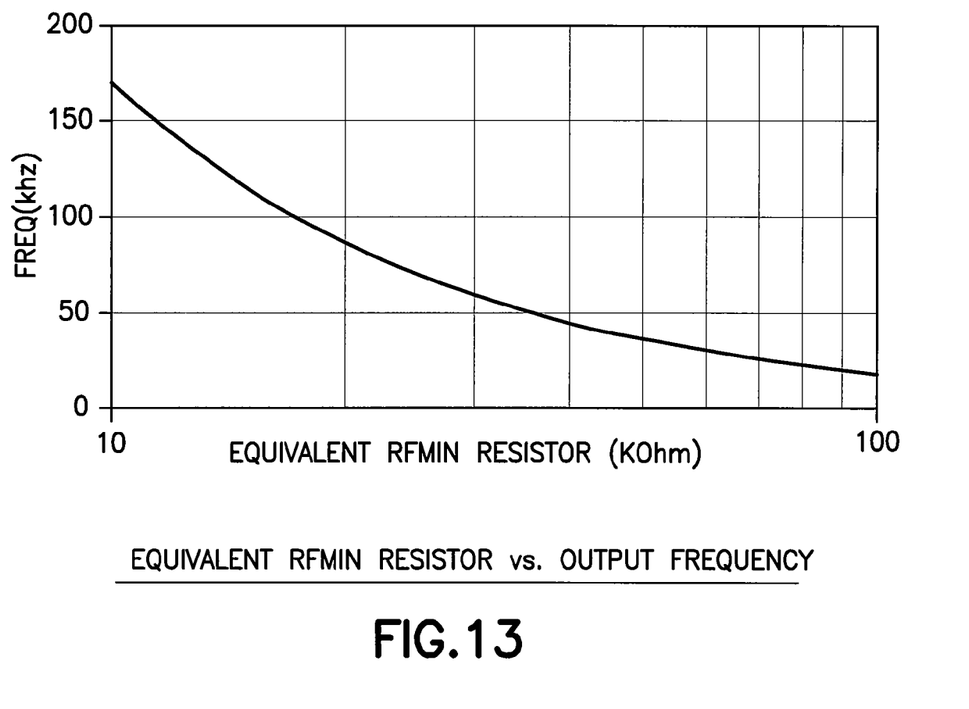
FIG. 13 is a graph of equivalent resistance verses frequency.

Use a graph of RFMIN vs. Frequency (FIG. 13) to select $R_{FMIN}$ value for desired run frequency.

Step 2: Program Preheat Frequency

The preheat frequency is programmed with timing resistors $R_{FMIN}$ and $R_{PH}$. The timing resistors are connected in parallel for the duration of the preheat time. The preheat frequency is therefore given as:

$$f_{PH} = \frac{R_{FMIN} + R_{PH}}{(4.8e-10) \cdot R_{FMIN} \cdot R_{PH}} \quad [Hertz] \qquad (3)$$

or $$R_{PH} = \frac{R_{FMIN}}{(4.8e-10) \cdot R_{FMIN} \cdot f_{PH} - 1} \quad [Ohms] \qquad (4)$$

or

Use a graph of RFMIN vs. Frequency (FIG. 13) to select $R_{EQUIV}$ value for desired preheat frequency. Then $R_{PH}$ is given as:

$$R_{PH} = \frac{R_{FMIN} \cdot R_{EQUIV}}{R_{FMIN} - R_{EQUIV}} \quad [Ohms] \qquad (5)$$

Step 3: Program Preheat Time

The preheat time is defined by the time it takes for the external capacitor on pin CPH to charge up to ⅔*VCC. An external resistor ($R_{CPH}$) connected to VCC charges capacitor CPH. The preheat time is therefore given as:

$$t_{PH} = R_{CPH} \cdot C_{PH} \quad [Seconds] \qquad (6)$$

or $$C_{PH} = \frac{t_{PH}}{R_{CPH}} \quad [Farads] \qquad (7)$$

Step 4: Program Ignition Ramp Time

The preheat time is defined by the time it takes for the external capacitor on pin VCO to charge up to 2V. The external timing resistor ($R_{PH}$) connected to FMIN charges capacitor $C_{VCO}$. The ignition ramp time is therefore given as:

$$t_{RAMP} = R_{PH} \cdot C_{VCO} \quad [\text{Seconds}] \quad (6)$$

or $$C_{VCO} = \frac{t_{RAMP}}{R_{PH}} \quad [\text{Farads}] \quad (7)$$

Step 5: Program Maximum Ignition Current

The maximum ignition current is programmed with the external resistor RCS and an internal threshold of 1.25V. This threshold determines the over-current limit of the ballast, which will be reached when the frequency ramps down towards resonance during ignition and the lamp does not ignite. The maximum ignition current is given as:

$$I_{IGN} = \frac{1.25}{R_{CS}} \quad [\text{Amps Peak}] \quad (9)$$

or $$R_{CS} = \frac{1.25}{I_{IGN}} \quad [\text{Ohms}] \quad (10)$$

The present application has specifically described the use of the operational amplifier 22 for use in providing a dimming function, however, it should be noted that the operational amplifier may be used for most any other suitable function as well. For example, the operational amplifier 22 may be used to regulate the lamp power. In other application areas, such as high intensity discharge (HID) lamp ballasts, the operational amplifier 22 may be used to regulate the maximum lamp current during the warm up phase of operation.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An IC for controlling a power supply circuit for delivering power to a fluorescent lamp, comprising:
    a ballast control section operable to provide drive signals to the power supply circuit; and
    an amplifier section integrated into the IC and operable to provide a dimming signal to the ballast control section, wherein the ballast control section drives the power supply circuit to provide for dimming of the lamp based on the dimming signal;
    wherein the amplifier section includes an operational amplifier including an inverting input, a noninverting input and an output; and wherein
    the IC includes:
    an INV pin connected to the inverting input of the operational amplifier;
    a NINV pin connected to the noninverting input of the operation amplifier; and
    an OUT pin connected to the output of the operational amplifier, such that each of the inverting and noninverting inputs and the output of the operational amplifier are accessible from an exterior of the IC.

2. The IC of claim 1, wherein the ballast control section provides the drive signals to the power supply circuit and receives current sense signals indicative of current in said lamp, and responds to the current sense signals by modifying the drive signals.

3. The IC of claim 2, wherein the ballast control section further comprises fault detection circuitry that receives the current sense signals and provides a detect signal when current through the lamp indicates a fault, and in response to said detect signal, causes the drive circuitry to cease providing the drive signals.

4. The IC of claim 3, wherein the fault detect circuitry further comprises end of life detection circuitry operable to provide the detect signal when the lamp reaches end of life.

5. The IC of claim 1, wherein the noninverting input receives dimming information from a dim device, the inverting input receives a power current signal indicative of a current through the power supply circuit and the output of the operation amplifier provides the dimming signal to the IC based on the dimming information and the power current signal.

6. The IC of claim 5, where in the dimming signal indicates that the ballast control section is to control the power supply circuitry to dim the lamp when the dimming input is lower than the power current signal.

7. An IC for controlling a power supply circuit for delivering power to a fluorescent lamp, comprising:
    a ballast control section operable to provide drive signals to the power supply circuit; and
    an amplifier section integrated into the IC, wherein the ballast control section provides the drive signals to the power supply circuit and receives current sense signals indicative of current in said lamp, and responds to the current sense signals by modifying the drive signals,
    further wherein the ballast control section further comprises fault detection circuitry that receives the current sense signals and provides a detect signal when current through the lamp indicates a fault, and in response to said detect signal, causes the drive circuitry to cease providing the drive signals.

8. The IC of claim 7, wherein the fault detect circuitry further comprises end of life detection circuitry operable to provide the detect signal when the lamp reaches end of life.

9. The IC of claim 8, wherein the amplifier section is operable to provide a dimming signal to the ballast control section and wherein the ballast control section drives the power supply circuit to provide for dimming of the lamp based on the dimming signal.

10. The IC of claim 9, wherein the amplifier section further comprises an operational amplifier including an inverting input, a noninverting input and an output.

11. The IC of claim 10, wherein the IC further comprises:
    an INV pin connected to the inverting input of the operational amplifier;
    a NINV pin connected to the noninverting input of the operation amplifier; and
    an OUT pin connected to the output of the operational amplifier, such that each of the inverting and noninverting inputs and the output of the operational amplifier are accessible from an exterior of the IC.

12. The IC of claim 11, wherein the noninverting input receives dimming information from a dim device, the inverting input receives a power current signal indicative of a current through the power supply circuit and the output of the operation amplifier provides the dimming signal to the IC based on the dimming information and the power current signal.

13. The IC of claim 12, where in the dimming signal indicates that the ballast control section is to control the power supply circuitry to dim the lamp when the dimming input is lower than the power current signal.

* * * * *